United States Patent
Wagner et al.

(10) Patent No.: US 12,534,678 B2
(45) Date of Patent: Jan. 27, 2026

(54) AQUEOUS EMULSIFIER PACKAGE WITH ANIONIC SURFACTANT FOR FUEL EMULSION

(71) Applicant: BASF SE, Ludwigshafen am Rhein (DE)

(72) Inventors: Jochen Wagner, Ludwigshafen (DE); Marcel Harhausen, Ludwigshafen (DE); Thorsten Schoeppe, Ludwigshafen (DE); Simon Steppan, Ludwigshafen (DE); Jens Meissner, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 18/251,569

(22) PCT Filed: Oct. 26, 2021

(86) PCT No.: PCT/EP2021/079610
§ 371 (c)(1),
(2) Date: May 3, 2023

(87) PCT Pub. No.: WO2022/096310
PCT Pub. Date: May 12, 2022

(65) Prior Publication Data
US 2023/0416627 A1 Dec. 28, 2023

(30) Foreign Application Priority Data
Nov. 4, 2020 (EP) .................................. 20205718
Nov. 11, 2020 (EP) .................................. 20207007

(51) Int. Cl.
*C10L 1/24* (2006.01)

(52) U.S. Cl.
CPC ..... *C10L 1/2437* (2013.01); *C10L 2200/0446* (2013.01); *C10L 2250/084* (2013.01); *C10L 2270/026* (2013.01); *C10L 2300/20* (2013.01)

(58) Field of Classification Search
CPC ........ C10L 1/10; C10L 1/1985; C10L 1/2431; C10L 1/2437; C10L 1/328; C10L 2200/0446; C10L 2250/08; C10L 2250/084; C10L 2270/026; C10L 2300/20
See application file for complete search history.

(56) References Cited

U.S. PATENT DOCUMENTS

| | | | |
|---|---|---|---|
| 4,388,893 A | 6/1983 | Apfel | |
| 6,274,756 B1 * | 8/2001 | Caers | .......... C10M 105/36 560/205 |
| 10,815,444 B2 | 10/2020 | Hansch et al. | |
| 2010/0037513 A1 * | 2/2010 | Petrucci | ............. C10L 1/328 44/301 |
| 2017/0321138 A1 * | 11/2017 | Fumagalli | ............. C10L 1/328 |
| 2020/0332072 A1 * | 10/2020 | Meredith | ............. C07C 227/06 |
| 2022/0220401 A1 * | 7/2022 | Harhausen | ............. C10L 1/2225 |

FOREIGN PATENT DOCUMENTS

| | | | |
|---|---|---|---|
| CN | 1055948 A | 11/1991 | |
| DE | 19747240 A1 | 7/1998 | |
| DE | 19747247 A1 | 7/1998 | |
| EP | 2612898 A1 | 7/2013 | |
| GB | 2496514 A | 5/2013 | |
| JP | S61-221295 A | 10/1986 | |
| WO | WO-90/12959 A1 | 11/1990 | |
| WO | WO-98/54274 A1 | 12/1998 | |
| WO | WO-00/53916 A1 | 9/2000 | |
| WO | WO-2006/135881 A2 | 12/2006 | |
| WO | WO-2008/060888 A2 | 5/2008 | |
| WO | WO-2009124920 A2 * | 10/2009 | ............. A01N 25/02 |
| WO | WO-2010/105620 A1 | 9/2010 | |
| WO | WO-2010/132259 A1 | 11/2010 | |
| WO | WO-2010/145652 A1 | 12/2010 | |
| WO | WO-2011/095819 A1 | 8/2011 | |
| WO | WO-2012/004300 A1 | 1/2012 | |
| WO | WO-2013/000997 A1 | 1/2013 | |
| WO | WO-2013/064689 A1 | 5/2013 | |
| WO | WO-2013/087701 A1 | 6/2013 | |
| WO | WO-2013/117616 A1 | 8/2013 | |
| WO | WO-2014/064151 A1 | 5/2014 | |
| WO | WO-2014/195464 A1 | 12/2014 | |
| WO | WO-2014/202425 A2 | 12/2014 | |
| WO | WO-2015/040147 A1 | 3/2015 | |
| WO | WO-2016/064722 A1 | 4/2016 | |
| WO | WO-2016/074904 A1 | 5/2016 | |
| WO | WO-2020224974 A1 * | 11/2020 | ............. C10L 1/143 |

OTHER PUBLICATIONS

European Search Report for EP Patent Application No. 20205718.8, Issued on Apr. 8, 2021, 3 pages.
International Search Report for PCT Patent Application No. PCT/EP2021/079610, Issued on Feb. 4, 2022, 4 pages.
International Preliminary Report on Patentability for PCT Patent Application No. PCT/EP2021/079610, Issued on Feb. 14, 2023, 14 pages.
Written Opinion for PCT Patent Application No. PCT/EP2021/079610, Issued on Feb. 4, 2022, 7 pages.

* cited by examiner

*Primary Examiner* — Latosha Hines
(74) *Attorney, Agent, or Firm* — Grüneberg and Myers PLLC

(57) ABSTRACT

A method for powering a diesel engine with a fuel emulsion involves preparing the fuel emulsion by emulsifying a fuel and water in the presence of an emulsifier package, which contains an anionic surfactant selected from sulfates and sulfonates. The emulsifier package for emulsifying a fuel and water and the fuel emulsion for powering a diesel engine are also provided.

20 Claims, No Drawings

AQUEOUS EMULSIFIER PACKAGE WITH ANIONIC SURFACTANT FOR FUEL EMULSION

CROSS-REFERENCE TO RELATED APPLICATIONS

This application is the National Stage entry under § 371 of International Application No. PCT/EP2021/079610, filed on Oct. 26, 2021, and which claims the benefit of priority to European Application No. 20205718.8, filed on Nov. 4, 2020, and to European Application No. 20207007.4, filed on Nov. 11, 2020. The content of each of these applications is hereby incorporated by reference in its entirety.

DESCRIPTION

The present invention relates to a method for powering a diesel engine with a fuel emulsion comprising the step of preparing the fuel emulsion by emulsifying a fuel and water in the presence of an emulsifier package which comprises an anionic surfactant selected from sulfates and sulfonates. It also relates to the emulsifier package for emulsifying a fuel and water; and to the fuel emulsion for powering a diesel engine.

Aqueous fuel emulsions are known for powering diesel engines.

Object of the present invention was to find an emulsifier package for fuel emulsions, which is cheap, easy to prepare, storage stable, based on commercial available emulsifiers, based only on carbon, hydrogen, nitrogen and oxygen, and allow for fast and easy emulsification even with low shear forces. The emulsifier package should result in a low foaming fuel emulsion, it should have a low cloud point, provide corrosion protection, have low foaming, improve filterability of the emulsion, and reduce precipitate when mixing the fuel with water. The emulsifier package should stabilize the fuel emulsion at high water concentrations, at various temperatures and pressures, with various types of water.

The object was achieved by a method for powering a diesel engine with a fuel emulsion comprising the step of preparing the fuel emulsion by emulsifying a fuel and water in the presence of an emulsifier package which comprises an anionic surfactant selected from sulfates and sulfonates.

The object was also achieved by the emulsifier package for emulsifying a fuel and water comprising
- an anionic surfactant selected from sulfates and sulfonates, where the sulfate is selected from $C_{6-22}$ alkyl sulfates and alkyl ether sulfates of the general formula R—O—$(CH_2CH_2O)_m SO_3$, in which R is a linear or branched alkyl and/or alkenyl radical having 6 to 22 carbon atoms and m is numbers from 1 to 10, and where the sulfonate is selected from di-$(C_{8-10})$ alkyl sulfosuccinates,
- at least two nonionic surfactants which are alkoxylates, where the alkoxylates are selected from alkoxylated alkanols, and
- water.

In another embodiment the object was achieved by an emulsifier package for emulsifying a fuel and water comprising
- a mixture of anionic surfactants, comprising at least one sulfate selected from $C_{6-22}$ alkyl sulfates and at least one alkyl ether sulfate of the general formula R—O—$(CH_2CH_2O)_m SO_3$, in which R is a linear or branched alkyl and/or alkenyl radical having 6 to 22 carbon atoms and m is numbers from 1 to 10,
- at least one nonionic surfactant which is an alkoxylated alkanol, and
- water.

The object was also achieved by the fuel emulsion for powering a diesel engine.

The fuel usually comprises hydrocarbons, such as alkanes, cycloalkanes and aromatics. The fuel may be obtained from petroleum distillation as distillate or residue. The fuels is usually a liquid fuel. Examples of fuels are gasoline, diesel or biodiesel or mixtures thereof, wherein gasoline or diesel are preferred. In particular the fuel is diesel. The gasoline may contain mainly C4 to C12 hydrocarbons of alkanes, alkenes and cycloalkanes. The diesel may contain saturated hydrocarbons and aromatic hydrocarbons. The biodiesel typically includes lower alkyl fatty acid esters, prepared, for example, by transesterifying trigycerides with lower alcohols, e.g. methanol or ethanol.

The viscosity of the fuel can vary in a broad range, such as in the range from 1 to 10,000 $mm^2/s$ at 40° C. (ISO 3104) or 1 to 1000 $mm^2/s$ at 50° C. (ISO 3104).

The fuel may be a marine fuel, such as MGO (Marine gas oil), MDO (Marine diesel oil), IFO (Intermediate fuel oil), MFO (Marine fuel oil), or HFO (Heavy fuel oil). Further examples for marine fuel are IFO 380 (an Intermediate fuel oil with a maximum viscosity of 380 centistokes (<3.5% sulphur)), IFO 180 (an Intermediate fuel oil with a maximum viscosity of 180 centistokes (<3.5% sulphur)), LS 380 (a Low-sulphur (<1.0%) intermediate fuel oil with a maximum viscosity of 380 centistokes), LS 180 (a Low-sulphur (<1.0%) intermediate fuel oil with a maximum viscosity of 180 centistokes), LSMGO (a Low-sulphur (<0.1%) Marine Gas Oil, which is often be used in European Ports and Anchorages according to EU Sulphur directive 2005/33/EC), or ULSMGO (a Ultra-Low-Sulphur Marine Gas Oil, also referred to as Ultra-Low-Sulfur Diesel (sulphur 0.0015% max). Further suitable marine fuels are according to DIN ISO 8217 of the category ISO-F-DMX, DMA, DFA, DMZ, DFZ, or DFB, or ISO-F RMA, RMB, RMD, RME, RMG, or RMK. Further suitable marine fuel is distillate marine diesel or residual marine diesel.

The viscosity of the fuel, such as the marine fuel, can vary in a broad range, such as in the range from 1 to 10,000 $mm^2/s$ at 40° C. (ISO 3104) or 1 to 1000 $mm^2/s$ at 50° C. (ISO 3104).

The fuel emulsion may contain at least 10, 20, 25, 30, 35, 40, 50 or 60 wt % of the fuel. The fuel emulsion may contain up to 30, 40, 50 or 60 wt % of the fuel. The fuel emulsion may contain 10 to 70 wt %, 20 to 60 wt %, or 30 to 50 wt % of the fuel.

For ecological reasons low sulfur fuel are of increasing interest. Suitable low sulfur fuels may contain less than 1, 0.5, 0.2, or 0.1 wt % sulfur. An example is Shell® ULSFO with less than 0.1 wt % sulfur. The diesel mainly used for cars may have a sulfur content of up to 2000 ppm, 500 ppm, 350 ppm, 50 ppm or 10 ppm.

Any kind of water can be used, such as tap water, well water, sea water, oceanic water, rain water, distilled water, waste water, or deionized water. Preferred is water with low chlorine concentration to avoid corrosion, such as tap water, distilled water or rain water.

The water may have a low hardness, e.g. as expressed by ° dH (degree of German hardness) below 8.4° dH, or a concentration of less than 1.5 mmol/l calcium carbonate.

The water may have a low salinity, such as up to 1000, 500, 100, 10, or 1 ppmw, e.g. based on the concentration of NaCl.

The fuel emulsion may contain at least 10, 20, 30, 40, 50, 55, 60, 65 or 70 wt % of the water. The fuel emulsion may contain up to 50, 60, 70, 75, 80, 85 or 90 wt % of the water. The fuel emulsion may contain 30 to 90 wt %, 40 to 80 wt %, or 50 to 80 wt % of the water.

The weight ratio of the water to the fuel can be in the range of 1:0.1 to 1:10, or 1:0.2 to 1:5, or 1:0.7 to 1:3, or preferably 1:0.1 to 1:1 The fuel emulsion can be an oil-in-water emulsion or a water-in-oil emulsion, where the oil-in-water emulsion is preferred.

The fuel emulsion may be a macroemulsion, miniemulsion or microemulsion, where the macroemulsion is preferred.

The dispersed phase (e.g. the fuel) in the fuel emulsion may have a diameter of 0.01 to 100 μm, preferably from 1 to 100 μm.

The fuel emulsion may be present at a temperature from 0 to 100° C., preferably from 15 to 90° C.

The fuel emulsion may be present at a pressure from 1 to 100 bar, preferably from 1 to 10 bar.

The emulsifier package comprises an anionic surfactant selected from sulfates and sulfonates.

Examples of sulfates are alkyl sulfates, alkyl ether sulfates, fatty acid sulfates, fatty acid ether sulfates, sulfates of ethoxylated alkylphenol, glycerol ether sulfates, monoglyceride sulfates, monoglycerlicde ether sulfates, fatty acid amide sulfates, fatty acid amide ether sulfates. Preferred sulfates are alkyl sulfates and alkyl ether sulfates, in particular alkyl sulfates. The sulfates can be salts of alkali metal, the monovalent charge equivalent of an alkaline earth metal, ammonium, mono-, di-, tri- or tetraalkylammonium, alkanolammonium or glucammonium.

Suitable alkyl sulfates are sulfates of fatty alcohols, where the fatty alcohol can be a linear or branched, saturated or unsaturated hydrocarbon radical having 6 to 22 carbon atoms. Suitable fatty alcohol sulfates are preferably obtained by sulfation of native fatty alcohols or synthetic oxo alcohols and subsequent neutralization. Typical examples of fatty alcohol sulfates are the sulfation products of caproic alcohol, caprylic alcohol, 2-ethylhexyl alcohol, capric alcohol, lauryl alcohol, isotridecyl alcohol, myristyl alcohol, cetyl alcohol, palmoleyl alcohol, stearyl alcohol, isostearyl alcohol, oleyl alcohol, elaidyl alcohol, petroselinyl alcohol, linolyl alcohol, linolenyl alcohol, behenyl alcohol and elaeostearyl alcohol, and also the salts and mixtures thereof. Preferred salts of the fatty alcohol sulfates are the sodium and potassium salts, in particular the sodium salts. The alkyl sulfates are usually linear or branched C6-22 alkyl sulfates, preferably linear or branched C8-18 alkyl sulfates, and in particular C8-12 alkyl sulfates.

In a preferred form the anionic surfactant is selected from C6-22 alkyl sulfates, more preferably from C8-18 alkyl sulfates, and in particular from C8-12 alkyl sulfates.

Suitable alkyl ether sulfates are fatty alcohol ether sulfates, where the fatty alcohol can be a linear or branched, saturated or unsaturated hydrocarbon radical having 6 to 22 carbon atoms, and the degree of ethoxylation can be 1 to 10. Suitable fatty alcohol ether sulfates are of the general formula R—O—(CH$_2$CH$_2$O)$_m$SO$_3$, in which R is a linear or branched alkyl and/or alkenyl radical having 6 to 22 carbon atoms, m is numbers from 1 to 10. Typical examples are the sulfates of addition products of on average 1 to 10 and in particular 2 to 5 mol of ethylene oxide onto caprolic alcohol, caprylic alcohol, 2-ethylhexyl alcohol, capric alcohol, lauryl alcohol, isotridecyl alcohol, myristyl alcohol, cetyl alcohol, palmoleyl alcohol, stearyl alcohol, isostearyl alcohol, oleyl alcohol, elaidyl alcohol, petroselinyl alcohol, arachyl alcohol, gadoleyl alcohol, behenyl alcohol, erucyl alcohol and brassidyl alcohol, and technical-grade mixtures thereof in the form of their sodium and/or magnesium salts.

In another preferred form the anionic surfactant is selected from alkyl ether sulfates of the general formula R—O—(CH$_2$CH$_2$O)$_m$SO$_3$, in which R is a linear or branched alkyl and/or alkenyl radical having 6 to 22 (more preferably 8 to 18) carbon atoms and m is numbers from 1 to 10 (more preferably from 1 to 5).

In another preferred form the anionic surfactant is a sulfate selected from C$_{6-22}$ alkyl sulfates and alkyl ether sulfates of the general formula R—O—(CH$_2$CH$_2$O)$_m$SO$_3$, in which R is a linear or branched alkyl and/or alkenyl radical having 6 to 22 carbon atoms and m is numbers from 1 to 10.

Examples of sulfonates are alkyl sulfonates, alkylarylsulfonates, diphenylsulfonates, olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkyhnaphthalenes, sulfosuccinates or sulfosuccinamates.

Suitable sulfocuccinates are monoalkyl sulfosuccinates and dialkyl sulfosuccinates, where the alkyl may be linear or branched C8, C9 or C10 alkyl. Preferably, the sulfosuccinates is dioctyl sulfosuccinates, such as sodium dioctyl sulfosuccinate and sodium di(2-ethylhexyl) sulfosuccinate.

In a preferred form the anionic surfactant is a sulfonate selected from di-(C$_{8-10}$) alkyl sulfosuccinates, such as linear or branched dioctyl sulfosuccinates.

Suitable sulfocuccinamates are mono- and dialkyl sulfosuccinamates, where the alkyl may be linear or branched C8, C9 or C10 alkyl.

Suitable olefin sulfonates are obtained e.g. by the addition reaction of SO3 onto olefins of the formula R—CH=CH—R' and subsequent hydrolysis and neutralization, where R and R', independently of one another, are H or alkyl radicals having 1 to 20 carbon atoms, with the proviso that R and R' together have at least 6 and preferably 8 to 20, specifically 10 to 16, carbon atoms.

Suitable alkyl sulfonates are C8-C18-alkyl sulfonates, e.g. sodium lauryl or cetyl sulfonate.

Suitable alkylaryl-sulfonates are C8-C18-alkylbenzene sulfonates, e.g. sodium hexadecylbenzene sulfonate.

Suitable sulfonates of oils are methyl ester sulfonates are obtained by sulfonation of the fatty acid methyl esters of plant or animal fats or oils.

The emulsifier package may comprise at least one (e.g. one, two or three) nonionic surfactant which is an alkoxylate. In another form the emulsifier package may comprise at least two (e.g. two or three) nonionic surfactant which are an alkoxylate.

Suitable nonionic surfactants are alkoxylates, alkylglucosides and alkyl polygucosides, or partial esters (such as mono-, di- and triesters) of fatty acids with glycerine or sorbitan (such as glycerine monostearate, sorbitanmonooleat, sorbitantristearat).

Suitable alkoxylates are
alkoxylated alkanoles, in particular ethoxylated fatty alcohols and ethoxylated oxoalcohols, such as ethoxylated lauryl alcohol, ethoxylated isotridecanol, ethoxylated cetyl alcohol, ethoxylated stearyl alcohol, and esters thereof, such as acetates
alkoxylated alkylphenols, such as ethoxylated nonylphenyl, ethoxylated dodecylphenyl, ethoxylated isotridecylphenol and the esters thereof, e.g. the acetates
block-copolymers of ethyleneoxide and propyleneoxide, ethoxylated alkylglucosides and alkyl polygucosides,
ethoxylated fatty amines,
ethoxylated fatty acids,
ethoxylated partial esters of fatty acids with glycerine or sorbitan, such as ethoxylated glycerine monostearate
ethoxylates of vegetable oils or animal fats, such as corn oil ethoxylate, castor oil ethoxylate, tallow oil ethoxylate,
ethoxylates of fatty amines or of fatty amides.

Preferred nonionic surfactants are alkoxylated alkanols.

Preferably, the alkoxylate is an alkoxylated alkanol. In another form suitable alkoxylates include alkoxylated alkanols, which are usually alkoxylated linear or branched, saturated or unsaturated $C_1$-$C_{20}$ (preferably $C_8$-$C_{20}$) alkanols, preferably ethoxylated, ethoxylated and propoxylated, or ethoxylated and butoxylated, linear or branched, saturated $C_2$-$C_{18}$ (preferably $C_{8-18}$) alkanols or more preferably, ethoxylated and propoxylated $C_4$-$C_{18}$ (preferably $C_{12}$-$C_{20}$) alkanols. The alkanol unit of the alkoxylated alkanol may be a technical mixture of various chain lengths and isomers. The total number of alkoxy units in the alkoxylated alkanols may range from 5 to 30, preferably from 10 to 25 alkoxy units (e.g. ethyleneoxy and/or propyleneoxy units). In another form the total number of alkoxy units in the alkoxylated alkanols may range from 1 to 100, preferably from 2 to 80 alkoxy units (e.g. ethyleneoxy and/or propyleneoxy units). The alkoxy units (e.g. EO and PO units) occur preferably in block sequence, in particular as diblock sequence. The polyalkoxylate chain of the alkoxylated alkanols may be terminated by a hydroxy group or a C1 to C4 alkyl, wherein the hydroxy group is preferred. In another form the alkoxy units (e.g. EO and PO units) occur preferably in block sequence, in particular as diblock sequence, and the polyalkoxylate chain of the alkoxylated alkanols is terminated by a hydroxy group.

In another form suitable alkoxylates are alkoxylated alkanols of the formula (I)

$$R^e\text{—O-(AO)}_m\text{—}R^f \quad (I)$$

in which
R$^e$ is straight-chain or branched alkyl or alkylene with from 1 to 32, preferably 4 to 32, more preferably from 10 to 22, carbon atoms,
AO is an ethylene oxide radical, propylene oxide radical, butylene oxide radical, pentylene oxide radical, styrene oxide radical or mixtures of the abovementioned radicals, e.g. in random or block sequence (wherein a diblock sequence is preferred),
m is numbers from 1 to 100, preferably 1 to 30, and
R$^1$ is hydrogen or alkyl with from 1 to 4 carbon atoms, preferably hydrogen.
AO is preferably an ethylene oxide radical, propylene oxide radical, butylene oxide radical, or mixtures of the abovementioned radicals.
m can be a number from 1 to 80, 2 to 80, or 3 to 60. In another form m can be a number from 1 to 30, 1 to 25, 1 to 20, 1 to 15, or 1 to 10. In another form m can be a number from 2 to 25, 2 to 15, 3 to 15, or 3 to 10. In another form m can be a number from 15 to 100, 20 to 70, or 25 to 60. In another form m is at least 1, 2, 3, 5, 10, 15, 20, 25 or 30. In another form m is up to 80, 70, 60, 50, 40, 30, 20, 15, 10, 5.

The molar ratio of ethylene oxide radical to other alkylene oxide radicals present in AO (e.g. propylene oxide radical) can be in the range of 50:1 to 1:2, or 10:1 to 1:1, or 5:1 to 1:1.

The alkoxylate may also be an alkoxylate block polymer, which may comprise blocks of polyethylene oxide and polypropylene oxide. The alkoxylate block polymers comprise usually at least 20 wt %, preferably at least 30 wt % of polymerized ethylene oxide. In a preferred form the alkoxylate block polymers comprise at least 10 wt %, preferably at least 15 wt % of polymerized ethylene oxide. The alkoxylate block polymers is preferably a block polymers A-B-A type comprising blocks of polyethylene oxide (block "A") and polypropylene oxide (block "B"). The alkoxylate block polymers are usually terminated on both ends by hydroxyl groups. The molecular weight of the alkoxylate block polymer may be from 1000 to 30000 Da, preferably from 2000 to 15000 Da.

Preferably, the emulsifier package comprises at least two nonionic surfactants which are alkoxylates selected from alkoxylated alkanols, such as the alkoxylated alkanols of the formula (I).

In another preferred embodiment the emulsifier package may further comprise at least quaternary ammonium surfactant (B), as described in WO 2020/224974, more preferably as described from page 4, line 1 to page 10, line 16 therein.

The quaternary ammonium compounds (B) are preferably of the formula $$^+NR^1R^2R^3R^4 A^-$$

in which
A$^-$ stands for an anion, preferably a carboxylate R$^5$COO$^-$ or a carbonate R$^5$O—COO$^-$,
and
R$^1$, R$^2$, R$^3$, R$^4$, and R$^5$ independently of another are an organic residue with from 1 to 100 carbon atoms, substituted or unsubstituted, preferably unsubstituted, linear or branched alkyl, alkenyl or hydroxyalkyl residue with 1 to 100, more preferably 1 to 75, even more preferably 1 to 30, most preferably 1 to 25 and especially 1 to 20 carbon atoms,
R$^5$ additionally may be substituted or unsubstituted cycloalkyl or aryl residues bearing 5 to 20, preferably 5 to 12 carbon atoms.

It is also possible that the anion may be multiply charged negatively, e.g. if anions of dibasic acids are used, in this case the stoichiometric ratio of the ammonium ions to the anions corresponds to the ratio of positive and negative charges.

The same is true for salts in which the cation bears more than one ammonium ion, e.g. of the substituents connect two or more ammonium ions.

In the organic residues the carbon atoms may be interrupted by one or more oxygen and/or sulphur atoms and/or one or more substituted or unsubstituted imino groups, and may be substituted by $C_6$-$C_{12}$-aryl, $C_5$-$C_{12}$-cycloalkyl or a five- or six-membered, oxygen-, nitrogen- and/or sulphur-containing heterocycle or two of them together form an unsaturated, saturated or aromatic ring which may be interrupted by one or more oxygen and/or sulphur atoms and/or one or more substituted or unsubstituted imino groups, where the radicals mentioned may each be substituted by functional groups, aryl, alkyl, aryloxy, alkyloxy, halogen, heteroatoms and/or heterocycles.

Two of the residues R$^1$ to R$^4$ may together form an unsaturated, saturated or aromatic ring, preferably a five-, six- or seven-membered ring (including the nitrogen atom of the ammonium ion).

In this case the ammonium cation may be a morpholinium, piperidinium, piperazinium, pyrrolidinium, imidazolinium or pyridinium cation.

In these definitions $C_1$-$C_{20}$-alkyl which may be substituted by functional groups, aryl, alkyl, aryloxy, alkyloxy, halogen, heteroatoms and/or heterocycles is, for example, methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, heptadecyl, octadecyl, eicosyl, 1,1-dimethylpropyl, 1,1-dimethylbutyl, 1,1,3,3-tetramethylbutyl, benzyl, 1-phenylethyl, 2-phenylethyl, α,α-dimethylbenzyl, benzhydryl, p-tolylmethyl, 1-(p-butylphenyl)ethyl, p-chlorobenzyl, 2,4-dichlorobenzyl, p-methoxybenzyl, methoxybenzyl, 2-cyanoethyl, 2-cyanopropyl, 2-methoxycarbonylethyl, 2-ethoxycarbonylethyl, 2-butoxycarbonylpropyl, 1,2-di-(methoxycarbonyl)ethyl, 2-methoxyethyl, 2-ethoxyethyl, 2-butoxyethyl, diethoxymethyl, diethoxyethyl, 1,3-dioxolan-2-yl, 1,3-dioxan-2-yl, 2-methyl-1,3-dioxolan-2-yl, 4-methyl-1,3-dioxolan-2-yl, 2-isopropoxyethyl, 2-butoxypropyl, 2-octyloxyethyl, chloromethyl, 2-chloroethyl, trichloromethyl, trifluoromethyl, 1,1-dimethyl-2-chloroethyl, 2-methoxyisopropyl, 2-ethoxyethyl, butylthiomethyl, 2-dodecylthioethyl, 2-phenylthioethyl, 2,2,2-trifluoroethyl, 2-hydroxyethyl, 2-hydroxypropyl, 3-hydroxypropyl, 4-hydroxybutyl, 6-hydroxyhexyl, 2-aminoethyl, 2-aminopropyl, 3-aminopropyl, 4-aminobutyl, 6-aminohexyl, 2-methylaminoethyl, 2-methylaminopropyl, 3-methylaminopropyl, 4-methylaminobutyl, 6-methylaminohexyl, 2-dimethylaminoethyl, 2-dimethylaminopropyl, 3-dimethylaminopropyl, 4-dimethylaminobutyl, 6-dimethylaminohexyl, 2-hydroxy-2,2-dimethylethyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl or 6-ethoxyhexyl, and $C_2$-$C_{20}$-alkyl interrupted by one or more oxygen and/or sulphur atoms and/or one or more substituted or unsubstituted imino groups is, for example, 5-hydroxy-3-oxa-pentyl, 8-hydroxy-3,6-dioxaoctyl, 11-hydroxy-3,6,9-trioxaundecyl, 7-hydroxy-4-oxaheptyl, 11-hydroxy-4,8-dioxaundecyl, 15-hydroxy-4,8,12-trioxapentadecyl, 9-hydroxy-5-oxanonyl, 14-hydroxy-5,10-oxatetradecyl, 5-methoxy-3-oxapentyl, 8-methoxy-3,6-dioxaoctyl, 11-methoxy-3,6,9-trioxaundecyl, 7-methoxy-4-oxaheptyl, 11-methoxy-4,8-dioxa-undecyl, 15-methoxy-4,8,12-trioxapentadecyl, 9-methoxy-5-oxanonyl, 14-methoxy-5,10-oxatetradecyl, 5-ethoxy-3-oxapentyl, 8-ethoxy-3,6-dioxaoctyl, 11-ethoxy-3,6,9-trioxaundecyl, 7-ethoxy-4-oxaheptyl, 11-ethoxy-4,8-dioxaundecyl, 15-ethoxy-4,8,12-trioxapentadecyl, 9-ethoxy-5-oxanonyl or 14-ethoxy-5,10-oxatetradecyl.

If two radicals form a ring, they can together be 1,3-propylene, 1,4-butylene, 1,5-pentylene, 2-oxa-1,3-propylene, 1-oxa-1,3-propylene, 2-oxa-1,3-propylene, 1-oxa-1,3-propenylene, 1-aza-1,3-propenylene, 1-$C_1$-$C_4$-alkyl-1-aza-1,3-propenylene, 1,4-buta-1,3-dienylene, 1-aza-1,4-buta-1,3-dienylene or 2-aza-1,4-buta-1,3-dienylene.

The number of oxygen and/or sulphur atoms and/or imino groups is not subject to any restrictions. In general, there will be no more than 5 in the radical, preferably no more than 4 and very particularly preferably no more than 3.

Furthermore, there is generally at least one carbon atom, preferably at least two carbon atoms, between any two heteroatoms.

Substituted and unsubstituted imino groups can be, for example, imino, methylimino, isopropylimino, n-butylimino or tert-butylimino.

Furthermore, functional groups can be carboxy, carboxamide, hydroxy, di($C_1$-$C_4$-alkyl)amino, $C_1$-$C_4$-alkyloxycarbonyl, cyano or $C_1$-$C_4$-alkyloxy, $C_6$-$C_{12}$-aryl which may be substituted by functional groups, aryl, alkyl, aryloxy, alkyloxy, halogen, heteroatoms and/or heterocycles is, for example, phenyl, tolyl, xylyl, α-naphthyl, β-naphthyl, 4-diphenylyl, chlorophenyl, dichlorophenyl, trichlorophenyl, difluorophenyl, methylphenyl, dimethylphenyl, trimethylphenyl, ethylphenyl, diethylphenyl, isopropylphenyl, tert-butylphenyl, dodecylphenyl, methoxyphenyl, dimethoxyphenyl, ethoxyphenyl, hexyloxyphenyl, methylnaphthyl, isopropylnaphthyl, chloronaphthyl, ethoxynaphthyl, 2,6-dimethylphenyl, 2,4,6-trimethylphenyl, 2,6-dimethoxyphenyl, 2,6-dichlorophenyl, 4-bromophenyl, 2- or 4-nitrophenyl, 2,4- or 2,6-dinitrophenyl, 4-dimethylaminophenyl, 4-acetylphenyl, methoxyethylphenyl or ethoxymethylphenyl, $C_5$-$C_{12}$-cycloalkyl which may be substituted by functional groups, aryl, alkyl, aryloxy, alkyloxy, halogen, heteroatoms and/or heterocycles is, for example, cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, methoxycyclohexyl, dimethoxycyclohexyl, diethoxycyclohexyl, butylthiocyclohexyl, chlorocyclohexyl, dichlorocyclohexyl, dichlorocyclopentyl or a saturated or unsaturated bicyclic system such as norbornyl or norbornenyl, a five- or six-membered, oxygen-, nitrogen- and/or sulphur-containing heterocycle is, for example, furyl, thienyl, pyrryl, pyridyl, indolyl, benzoxazolyl, dioxolyl, dioxyl, benzimidazolyl, benzothiazolyl, dimethylpyridyl, methylquinolyl, dimethylpyrryl, methoxyfuryl, dimethoxypyridyl, difluoropyridyl, methylthienyl, isopropylthienyl or tert-butylthienyl and $C_1$ to $C_4$-alkyl is, for example, methyl, ethyl, propyl, isopropyl, n-butyl, sec-butyl or tert-butyl.

The residues $R^1$ to $R^5$ are preferably $C_2$-$C_{18}$-alkyl or $C_6$-$C_{12}$-aryl, more preferably $C_4$-$C_{16}$-alkyl or $C_6$-$C_{12}$-aryl, and even more preferably $C_4$-$C_{16}$-alkyl or $C_6$-aryl.

The residues $R^1$ to $R^5$ may be saturated or unsaturated, preferably saturated.

Preferred residues $R^1$ to $R^5$ do not bear any heteroatoms other than carbon of hydrogen.

Preferred examples of $R^1$ to $R^4$ are methyl, ethyl, propyl, isopropyl, n-butyl, sec-butyl, tert-butyl, pentyl, hexyl, heptyl, octyl, 2-ethylhexyl, 2,4,4-trimethylpentyl, 2-propylheptyl, decyl, dodecyl, tetradecyl, heptadecyl, octadecyl, eicosyl, 1,1-dimethylpropyl, 1,1-dimethylbutyl, 1,1,3,3-tetramethylbutyl, benzyl, 1-phenylethyl, 2-phenylethyl, α,α-dimethylbenzyl, benzhydryl, p-tolylmethyl or 1-(p-butylphenyl)ethyl.

In a preferred embodiment at least one of the residues $R^1$ to $R^4$ is selected from the group consisting of 2-hydroxyethyl, hydroxyprop-1-yl, hydroxyprop-2-yl, 2-hydroxybutyl or 2-hydroxy-2-phenylethyl.

In one embodiment $R^5$ is a polyolefin-homo- or copolymer, preferably a polypropylene, polybutene or polyisobutene residue, with a number-average molecular weight (Mn) of 85 to 20000, for example 113 to 10 000, or 200 to 10000 or 350 to 5000, for example 350 to 3000, 500 to 2500, 700 to 2500, or 800 to 1500. Preferred are polypropenyl, polybutenyl and polyisobutenyl radicals, for example with a number-average molecular weight Mn of 3500 to 5000, 350 to 3000, 500 to 2500, 700 to 2500 and 800 to 1500 g/mol.

Preferred examples of anions $A^-$ are the anions of acetic acid, propionic acid, butyric acid, 2-ethylhexanoic acid, trimethylhexanoic acid, 2-propylheptanoic acid, isononanoic acid, versatic acids, decanoic acid, undecanoic acid, dodecanoic acid, saturated or unsaturated fatty acids with 12 to 24 carbon atoms, or mixtures thereof, salicylic acid, oxalic acid mono-$C_1$-$C_4$-alkyl ester, phthalic acid mono-$C_1$-$C_4$-alkyl ester, $C_{12}$-$C_{100}$-alkyl- and -alkenyl succinic acid, especially dodecenyl succinic acid, hexadecenyl succinic acid, eicosenyl succinic acid, and polyisobutenyl succinic acid. Further examples are methyl carbonate, ethyl carbonate, n-butyl carbonate, 2-hydroxyethyl carbonate, and 2-hydroxypropyl carbonate.

In one preferred embodiment the nitrogen compounds quaternized in the presence of an acid or in an acid-free manner are obtainable by addition of a compound which comprises at least one oxygen- or nitrogen-containing group reactive with an anhydride and additionally at least one quaternizable amino group onto a polycarboxylic anhydride compound and subsequent quaternization, especially with an epoxide, e.g. styrene or propylene oxide, in the absence of free acid, as described in WO 2012/004300, or with a carboxylic ester, e.g. dimethyl oxalate or methyl salicylate. Suitable compounds having at least one oxygen- or nitrogen-containing group reactive with anhydride and additionally at least one quaternizable amino group are especially polyamines having at least one primary or secondary amino group and at least one tertiary amino group, especially N,N-dimethyl-1,3-propane diamine, N,N-dimethyl-1,2-ethane diamine or N,N, N'-trimethyl-1,2-ethane diamine. Useful polycarboxylic anhydrides are especially dicarboxylic acids such as succinic acid, having a relatively long-chain hydrocarbyl substituent, preferably having a number-average molecular weight Mn for the hydrocarbyl substituent of 200 to 10.000, in particular of 350 to 5000. Such a quaternized nitrogen compound is, for example, the reaction product, obtained at 40° C., of polyisobutenylsuccinic anhydride, in which the polyisobutenyl radical typically has an Mn of 1000, with 3-(dimethylamino)propylamine, which constitutes a polyisobutenylsuccinic monoamide and which is subsequently quaternized with dimethyl oxalate or methyl salicylate or with styrene oxide or propylene oxide in the absence of free acid.

Further quaternized nitrogen compounds suitable as compounds (B) are described in WO 2006/135881 A1, page 5, line 13 to page 12, line 14;
WO 10/132259 A1, page 3, line 28 to page 10, line 25;
WO 2008/060888 A2, page 6, line 15 to page 14, line 29;
WO 2011/095819 A1, page 4, line 5 to page 9, line 29;
GB 2496514 A, paragraph [00012] to paragraph [00041];
WO 2013/117616 A1, page 3, line 34 to page 11, line 2;
WO 14/202425 A2, page 3, line 14 to page 5, line 9;
WO 14/195464 A1, page 15, line 31 to page 45, line 26 and page 75, lines 1 to 4;
WO 15/040147 A1, page 4, line 34 to page 5, line 18 and page 19, line 11 to page 50, line 10;
WO 14/064151 A1, page 5, line 14 to page 6, line 17 and page 16, line 10 to page 18, line 12;
WO 2013/064689 A1, page 18, line 16 to page 29, line 8; and
WO 2013/087701 A1, page 13, line 25 to page 19, line 30,
WO 13/000997 A1, page 17, line 4 to page 25, line 3,
WO 12/004300, page 5, lines 20 to 30, page 8, line 1 to page 10, line 10, and page 19, line 29 to page 28, line 3, each of which is incorporated herein by reference.

In one embodiment the quaternized ammonium compound (B) is of formula

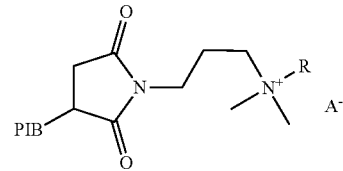

wherein in this formula
PIB stands for a polyisobutenyl residue having a number average molecular weight Mn of from 550 to 2300, preferably from 650 to 1500 and more preferably from 750 to 1300 g/mol,
R stands for an $C_1$- to $C_4$-alkyl or hydroxy-$C_1$- to $C_4$-alkyl, preferably methyl or 2-hydroxypropyl, and
$A^-$ stands for an anion, preferably carboxylate $R^5COO^-$ or a carbonate $R^5O$—$COO^-$ as defined above, more preferably acetate, salicylate or methyloxalate.

In another preferred embodiment the quaternized ammonium compound (B) is of formula

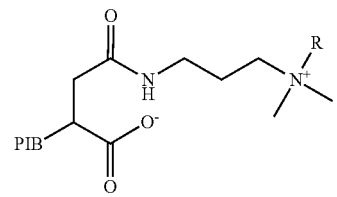

wherein in this formula
PIB stands for a polyisobutenyl residue having a number average molecular weight Mn of from 550 to 2300, preferably from 650 to 1500 and more preferably from 750 to 1300 g/mol, R stands for a hydroxy-$C_1$- to $C_4$-alkyl, preferably 2-hydroxypropyl.

In another embodiment the quaternized compound (B) is of formula

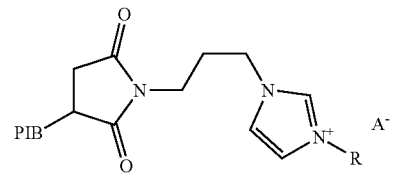

wherein in this formula
PIB stands for a polyisobutenyl residue having a number average molecular weight Mn of from 550 to 2300, preferably from 650 to 1500 and more preferably from 750 to 1300 g/mol, R stands for an $C_1$- to $C_4$-alkyl or hydroxy-$C_1$- to $C_4$-alkyl, preferably methyl, and $A^-$ stands for an anion, preferably carboxylate $R^5COO^-$ or a carbonate $R^5O$—$COO^-$ as defined above, more preferably salicylate or methyloxalate.

In another embodiment the quaternized ammonium compound (B) is of formula

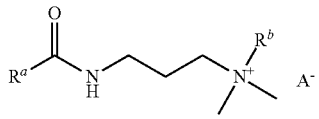

wherein in this formula $R^a$ stands for $C_1$-$C_{20}$-alkyl, preferably $C_9$- to $C_{17}$-alkyl, more preferably for undecyl, tridecyl, pentadecyl or heptadecyl, $R^b$ stands for a hydroxy-$C_1$- to $C_4$-alkyl, preferably 2-hydroxypropyl or 2-hydroxybutyl, and $A^-$ stands for an anion, preferably carboxylate $R^5COO^-$, as defined above, more preferably $R^5COO^-$ being a carboxylate of a fatty acid, especially $A^-$ being acetate, 2-ethylhexanoate, oleate or polyisobutenyl succinate.

In one embodiment the quaternized ammonium compound (B) is of formula

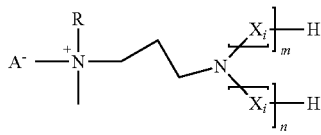

wherein in this formula $X_i$ for i=1 to n and 1 to m are independently of another selected from the group consisting of —$CH_2$—$CH_2$—O—, —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—$CH(C_2H_5)$—O—, —$CH(C_2H_5)$—$CH_2$—O— and —$CH(CH_3)$—$CH(CH_3)$—O—, preferably selected from the group consisting of —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—$CH(C_2H_5)$—O—, —$CH(C_2H_5)$—$CH_2$—O— and —$CH(CH_3)$—$CH(CH_3)$—O—, more preferably selected from the group consisting of —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—$CH(C_2H_5)$—O— and —$CH(C_2H_5)$—$CH_2$—O—, most preferably selected from the group consisting of —$CH_2$—$CH(C_2H_5)$—O—, —$CH(C_2H_5)$—$CH_2$—O—, —$CH_2$—$CH(CH_3)$—O— and —$CH(CH_3)$—$CH_2$—O—, and especially selected from the group consisting of —$CH_2$—$CH(CH_3)$—O— and —$CH(CH_3)$—$CH_2$—O—, m and n independently of another are positive integers, with the proviso that the sum (m+n) is from 2 to 50, preferably from 5 to 40, more preferably from 10 to 30, and especially from 15 to R stands for an $C_1$- to $C_4$-alkyl, preferably methyl, and $A^-$ stands for an anion, preferably carboxylate $R^5O$—$COO^-$ or a carbonate $R^5O$—$COO^-$ as defined above, more preferably salicylate or methyloxalate.

In another preferred embodiment the quaternized ammonium compound (B) is of formula

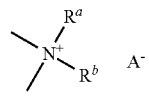

wherein in this formula $R^a$ and $R^b$ independently of another stand for $C_1$-$C_{20}$-alkyl or hydroxy-$C_1$- to $C_4$-alkyl, preferably $R^a$ stands for $C_1$-$C_{20}$-alkyl, preferably ethyl, n-butyl, n-octyl, n-dodecyl, tetradecyl or hexadecyl, and $R^b$ stands for hydroxy-$C_1$- to $C_4$-alkyl, preferably 2-hydroxypropyl, $A^-$ stands for an anion, preferably carboxylate $R^5COO^-$ or a carbonate $R^5O$—$COO^-$ as defined above, more preferably $C_{12}$-$C_{100}$-alkyl- and -alkenyl succinic acid, especially dodecenyl succinic acid, hexadecenyl succinic acid, eicosenyl succinic acid, and polyisobutenyl succinic acid.

Especially the quaternary ammonium surfactant (B) may be N,N-dimethyl-N-hexydecylamine quaternized with propylene oxide and polyisobutylenesuccinic acid obtained from succinic acid and polyisobutylene (Mn about 1000 g/mol).

The emulsifier package may comprise the anionic surfactant or the nonionic surfactant in certain percentages by weight, which may be calculated based on the total amount of surfactants (e.g. the anionic and the nonionic surfactants) present in the emulsifier package.

The emulsifier package may comprise at least 0.1, 0.5, 1, 5, 10, 20, 30 or 40 wt % of the anionic surfactant.

The emulsifier package may comprise up to 100, 90, 80, 70, 60, 50, 40, 30, 20, 10 or 5 wt % of the anionic surfactant.

The emulsifier package may comprise 0.1 to 20 wt %, or 0.5 to 10 wt %, or 1 to 5 of the anionic surfactant. In another form the emulsifier package may comprise 1 to 99 wt %, 5 to 90 wt %, 10 to 80 wt %, or 20 to 70 wt % of the anionic surfactant.

The emulsifier package may comprise 0.1 to 20 wt %, or 0.5 to 10 wt %, or 1 to 5 of the anionic surfactant, where the anionic surfactant is a sulfate selected from $C_{6-22}$ alkyl sulfates and alkyl ether sulfates of the general formula R—O—$(CH_2CH_2O)_m SO_3$, in which R is a linear or branched alkyl and/or alkenyl radical having 6 to 22 carbon atoms and m is numbers from 1 to 10.

The emulsifier package may comprise 0.1 to 20 wt %, or 0.5 to 10 wt %, or 1 to 5 of the anionic surfactant, where the anionic surfactant is a mixture of anionic surfactants, comprising at least one $C_{6-22}$ alkyl sulfate and at least one alkyl ether sulfate of the general formula R—O—$(CH_2CH_2O)_m SO_3$, in which R is a linear or branched alkyl and/or alkenyl radical having 6 to 22 carbon atoms and m is numbers from 1 to 10.

The emulsifier package may comprise 0.1 to 20 wt %, or 0.5 to 10 wt %, or 1 to 5 of the anionic surfactant, where the anionic surfactant is a sulfonate selected from di-($C_{8-10}$) alkyl sulfosuccinates.

The emulsifier package may comprise at least 0.1, 0.5, 2, 5, 10, 20, 30 or 40 wt % of the nonionic surfactant.

The emulsifier package may comprise up to 90, 80, 70, 60, 50, 40, 30, 20, 10, 5, 3, 1, 0.5 or 0.1 wt % of the nonionic surfactant. In another form the emulsifier package is free of the nonionic surfactant.

The emulsifier package may comprise 0.1 to 20 wt %, or 0.5 to 10 wt %, or 1 to 5 of the nonionic surfactant. In another form the emulsifier package may comprise 1 to 99 wt %, 5 to 90 wt %, 10 to 80 wt %, or 20 to 70 wt % of the nonionic surfactant.

The emulsifier package may comprise at least 0.1, 0.5, 2, 5, 10, 20, 30 or 40 wt % of the nonionic surfactant, where the nonionic surfactant comprises at least one (preferably at least two) nonionic surfactants which are alkoxylates selected from alkoxylated alkanols.

The emulsifier package may comprise up to 80, 70, 60, 50, 40, 30, 20, 10 or 5 wt % of the nonionic surfactant, where the nonionic surfactant comprises at least one (preferably at least two) nonionic surfactants which are alkoxylates selected from alkoxylated alkanols.

The emulsifier package may comprise 0.1 to 20 wt %, or 0.5 to 10 wt %, or 1 to 5 of the nonionic surfactant, where the nonionic surfactant comprises at least one (preferably at least two) nonionic surfactants which are alkoxylates selected from alkoxylated alkanols. In another form the emulsifier package may comprise 1 to 99 wt %, 5 to 90 wt %, 10 to 80 wt %, or 20 to 70 wt % of the nonionic surfactant, where the nonionic surfactant comprises at least one (preferably at least two) nonionic surfactants which are alkoxylates selected from alkoxylated alkanols.

The emulsifier package may comprise at least 0.5, 2, 5, 10, 20, 30, 40, 50, 60, 70, 80, 90 or 95 wt % of the sum of the anionic surfactant and the nonionic surfactant.

The emulsifier package may comprise up to 100, 90, 80, 70, 60, 50, 40, 30, 20, 15, or 10 wt % of the sum of the anionic surfactant and the nonionic surfactant.

The emulsifier package may comprise 1 to 90 wt %, 1 to 60 wt %, 1 to 35 wt %, or 2 to 20 wt %, or to 12 of the sum of the anionic surfactant and the nonionic surfactant.

The emulsifier package may comprise the anionic surfactant and the nonionic surfactant in a weight ratio of 4:1 to 1:20, or 2:1 to 1:10, or 1.5:1 to 1:7.

The emulsifier package may comprise the anionic surfactant and the nonionic surfactant in a weight ratio of 4:1 to 1:20, or 2:1 to 1:10, or 1.5:1 to 1:7, where the anionic surfactant is a sulfate selected from $C_{6-22}$ alkyl sulfates and alkyl ether sulfates of the general formula R—O—$(CH_2CH_2O)_m SO_3$, in which R is a linear or branched alkyl and/or alkenyl radical having 6 to 22 carbon atoms and m is numbers from 1 to 10.

The emulsifier package may comprise the mixture of anionic surfactants and the nonionic surfactant in a weight ratio of 4:1 to 1:20, or 2:1 to 1:10, or 1.5:1 to 1:7, where the anionic surfactant is a mixture of at least one sulfate selected from $C_{6-22}$ alkyl sulfates and at least one alkyl ether sulfate of the general formula R—O—$(CH_2CH_2O)_m SO_3$, in which R is a linear or branched alkyl and/or alkenyl radical having 6 to 22 carbon atoms and m is numbers from 1 to 10.

The emulsifier package may comprise the anionic surfactant and the nonionic surfactant in a weight ratio of 4:1 to 1:20, or 2:1 to 1:10, or 1.5:1 to 1:7, where the anionic surfactant is a sulfonate selected from di-($C_{8-10}$) alkyl sulfosuccinates.

The emulsifier package may comprise the anionic surfactant and the nonionic surfactant in a weight ratio of 4:1 to 1:20, or 2:1 to 1:10, or 1.5:1 to 1:7, where the anionic surfactant is a sulfate selected from $C_{6-22}$ alkyl sulfates and alkyl ether sulfates of the general formula R—O—$(CH_2CH_2O)_m SO_3$, in which R is a linear or branched alkyl and/or alkenyl radical having 6 to 22 carbon atoms and m is numbers from 1 to 10, and where the nonionic surfactant comprises at least one (preferably at least two) nonionic surfactants which are alkoxylates selected from alkoxylated alkanols.

The emulsifier package may comprise the mixture of anionic surfactants and the nonionic surfactant in a weight ratio of 4:1 to 1:20, or 2:1 to 1:10, or 1.5:1 to 1:7, where the anionic surfactant is a mixture of at least one sulfate selected from $C_{6-22}$ alkyl sulfates and at least one alkyl ether sulfate of the general formula R—O—$(CH_2CH_2O)_m SO_3$, in which R is a linear or branched alkyl and/or alkenyl radical having 6 to 22 carbon atoms and m is numbers from 1 to 10, and where the nonionic surfactant comprises at least one nonionic surfactants which are alkoxylates selected from alkoxylated alkanols, preferably alkoxylated saturated $C_2$-$C_{18}$ (preferably $C_{8-18}$) alkanols or more preferably, ethoxylated and/or propoxylated $C_4$-$C_{18}$ (preferably $C_{12}$-$C_{20}$) alkanols, more preferably 5 to 30-fold, even more preferably from 10 to 25-fold ethoxylated and/or propoxylated, especially ethoxylated $C_{12}$-$C_{20}$ alkanols.

The emulsifier package may comprise the anionic surfactant and the nonionic surfactant in a weight ratio of 4:1 to 1:20, or 2:1 to 1:10, or 1.5:1 to 1:7, where the anionic surfactant is a sulfonate selected from di-($C_3$-10) alkyl sulfosuccinates, and where the nonionic surfactant comprises at least one (preferably at least two) nonionic surfactants which are alkoxylates selected from alkoxylated alkanols.

The emulsifier package is usually an aqueous emulsifier package, that usually comprises water. The emulsifier package may comprise at least 1, 5, 10, 20, 30, 40, 50, 60, 70, 80, or 90 wt % of water, usually based on the total weight of the emulsifier package.

In another form the emulsifier package is essentially free of water and contains for example less than 10, 8, 6, 4, 2, 1 or 0.2 wt % water.

The emulsifier package is usually liquid, solid, or a gel at 20° C., preferably it is a liquid.

The emulsifier package may comprise an organic solvent, which is preferably miscible with water (e.g. at 20° C. in an amount of at least 10 wt %). Suitable organic solvents are ethers (e.g. glykol ether), ketones, or alcohols, where ether (especially glylkol ether) are preferred.

Preferred organic solvents are glykol ether, such as methyldiglykol, methyltriglykol, methyltetraglykol, butyltriglykol, butylglykol, butyldiglykol, and hexyldiglykol.

The emulsifier package may comprise up to 90, 80, 70, 60, 50, 40, 30, 20, 15, or 10 wt % of the organic solvent, such as the glykol ether.

The emulsifier package may comprise at least 1, 5, 10, 20, 30, 40, 50, 60, 70, 80, or 90 wt % of the organic solvent, usually based on the total weight of the emulsifier package.

The emulsifier package may comprise 0.5 to 30 or 1 to 15 wt % of the organic solvent, such as the glykol ether.

In another form the emulsifier package may comprise water, the organic solvent, or a mixture of water and the organic solvent. In another form the emulsifier package may comprise at least 1, 5, 10, 20, 30, 40, 50, 60, 70, 80, or 90 wt % of water, the organic solvent, or a mixture of water and the organic solvent.

The fuel or the emulsifier package may comprise further additives, such as carrier oils, cold flow improvers, lubricity improvers, corrosion inhibitors, dehazers, antifoams, cetane number improvers, combustion improvers, antioxidants or stabilizers, antistats, metallocenes, metal deactivators, and/or dyes. The fuel or the emulsifier package may comprise up to 50, 30, 10, 5, or 1 wt % of further additives. In another form the emulsifier package may be free of further additives.

In a preferred embodiment the emulsifier package may comprise at least one corrosion inhibitor as further additive. Preferred examples of such corrosion inhibitors are aliphatic, cycloaliphatic or aromatic mono-, di- or polycarboxylic acids with at least 6 carbon atoms. Preferred are aliphatic or cycloaliphatic mono-, dicarboxylic acids with at least 6 carbon atoms.

Useful linear or branched-chain, aliphatic or cycloaliphatic monocarboxylic acids are, for example hexanoic acid, 2,2-dimethylbutaneoic acid, cyclohexyl acetic acid, octanoic acid, 2-ethylhexanoic acid, nonanoic acid, isononanoic acid, decanoic acid, undecanoic acid or dodecanoic acid.

Especially preferred are 2-ethylhexanoic acid and isononanoic acid.

As used herein, isononanoic acid refers to one or more branched-chain aliphatic carboxylic acids with 9 carbon atoms. Embodiments of isononanoic acid used in the engine coolant composition may include 7-methyloctanoic acid (e.g., CAS Nos. 693-19-6 and 26896-18-4), 6,6-dimethylheptanoic acid (e.g., CAS No. 15898-92-7), 3,5,5-trimethylhexanoic acid (e.g., CAS No. 3302-10-1), 3,4,5-trimethylhexanoic acid, 2,5,5-trimethylhexanoic acid, 2,2,4,4-tetramethylpentanoic acid (e.g., CAS No. 3302-12-3) and combinations thereof. In a preferred embodiment, isononanoic acid has as its main component greater than 90% of one of 7-methyloctanoic acid, 6,6-dimethylheptanoic acid, 3,5,5-trimethylhexanoic acid, 3,4,5-trimethylhexanoic acid, 2,5,5-trimethylhexanoic acid, and 2,2,4,4-tetramethylpentanoic acid. The balance of the isononanoic acid may include other nine carbon carboxylic acid isomers and minor amounts of one or more contaminants. In a preferred embodiment, the isononanoic acid has as its main component greater than 90% of 3,5,5-trimethylhexanoic acid and even more preferably, the main component is greater than 95% 3,5,5-trimethylhexanoic acid.

If used, di- or tricarboxylic acids can be aliphatic, cycloaliphatic or aromatic, preferably aliphatic or aromatic and more preferably aliphatic with up to 20 carbon atoms, preferably with up to 18, more preferably with up to 16, even more preferably with up to 14, and especially up to 12 carbon atoms.

If used, examples of dicarboxylic acids are adipic acid, pimelic acid, suberic acid, azelaic acid, sebacic acid, undecanedioic acid, dodecanedioic acid, alkyl or alkenyl succinic acids, 2-metylbutane dioic acid, 2-ethylpentanedioic acid, 2-n-dodecylbutanedioic acid, 2-ndodecenylbutanedioic acid, 2-phenylbutanedioic acid, 2-(p-methylphenyl) butanedioic acid, 2,2-dimethylbutanedioic acid, 2,3-dimethylbutanedioic acid; 2,3,4 trimethylpentanedioic acid, 2,2,3-trimethylpentanedioic acid; 2-ethyl-3-methylbutanedioic maleic acid, fumaric acid, pent-2-enedioic acid, hex-2-enedioic acid; hex-3-enedioic acid; 5-methylhex-2-enedioic acid; 2,3-dimethylpent-2-enedioic acid; 2-methylbut-2-enedioic acid, 2-dodecylbut-2-enedioic acid, phthalic acid, isophthalic acid, terephthalic acid and substituted phthalic acids such as 3-methylbenzene-1,2-dicarboxylic acid; 4-phenylbenzene-1,3-dicarboxylic acid; 2-(1-propenyl) benzene-1,4-dicarboxylic acid, and 3,4-dimethylbenzene-1,2-dicarboxylic acid.

Furthermore, fatty acid dimers are preferred carboxylic acids as corrosion inhibitors, e.g. dimeric oleic acid; CAS: 61788-89-4.

Other preferred examples of such corrosion inhibitors are the quaternary ammonium compounds mentioned above.

The fuel emulsion comprises the emulsifier package in an amount of up to 5, 3, 2, 1, 0.8, 0.6, 0.4, or 0.3 wt % based on the diesel.

The fuel emulsion comprises the emulsifier package in an amount of 0.001 to 1.0 wt %, 0.01 to 0.5 wt %, 0.01 to 0.4 wt % or 0.05 to 0.3 wt % based on the diesel.

The fuel emulsion comprises the emulsifier package in an amount of up to 2, 1, 0.5, 0.2, 0.1, 0.08 wt % based on the fuel emulsion.

The fuel emulsion comprises the emulsifier package in an amount of 0.001 to 0.5, 0.005 to 0.15, 0.005 to 0.4, or 0.02 to 0.08 wt % based on the fuel emulsion.

The powering of a diesel engine with a fuel emulsion is known. Suitable diesel engines are for example a large turbocharged two-stroke diesel engine (e.g. as described in WO 2010/145652 or WO 2010/105620) or a two-strock diesel engine (e.g. as described in DE 19747247 or DE 19747240). The diesel engine may be used for stationary land engines (generators), railroad locomotives, cars, trucks, river ships, or ocean ships. The large two-stroke diesel engines may be used as prime mover in power plants or in ocean ships.

The emulsifying of the fuel and the water may be achieved by application of mechanical shear energy, e.g. in a stirred vessel, milling aggregates (like ball mills or stirred ball mills), shaking, rotor stator mixing, the turbulent flow through a pipe conveyed by pumps or by gravity, static mixers and counter current flow mixers. The emulsifying of the fuel and the water may also be achieved by a circulating the fuel and the water through a loop, e.g. by pumping them from the bottom of a tank to the top of the tank, where they are dumped on the surface of the tank content. Prior to the circulating of the fuel and the water a pre-stirring is possible, but not required.

The emulsifier package may contain different components, e.g. the anionic and optionally the nonionic surfactant. For emulsifying the fuel and the water some components may be added to the fuel and some components may be added to the water prior to emulsifying. Thus, the different components of the emulsifier package may be combined during the preparing of the fuel emulsion. Preferably, all components of the emulsifier package are premixed prior to emulsifying. Preferably, all components of the emulsifier package are added at the same time to the fuel or the water prior to emulsifying. The present invention may also relate to a fuel for powering a diesel engine with a fuel emulsion where the water comprises the emulsifier package.

The emulsifying can be made at temperatures of 0 to 100° C., or 10 to 90° C., or 20 to 50° C. The emulsifying can be made at pressures of 0.5 to 20 bar, or 1 to 10 bar.

The time between the preparation of the fuel emulsion and its combustion in the diesel engine may be below 24 h, 6 h, 1 h, 45 min, 30 min, 15 min, 10 min, 5 min or 1 min.

Various devices for emulsifying the fuel and the water in diesel engines are known, for example from WO 2016/064722, WO 90/12959, U.S. Pat. No. 4,388,893, or WO 00/53916.

It is an advantage of the emulsifier packages according to the present invention that they provide an increased corrosion protection even in the absence of dedicated corrosion inhibitors as further additives mentioned above. Even emulsifier packages which comprise an anionic surfactant selected from sulfates and sulfonates exhibit a certain anti-corrosive activity, preferably if the emulsifier packages further comprise at least one nonionic surfactant, more preferably if the emulsifier packages further comprise at least one quaternary ammonium surfactant.

EXAMPLES

Sulfate A: Sulphuric acid mono fatty alkyl ester, sodium salt, paste-like anionic surfactant, about 30 wt %, solubility in water at least 250 g/l at 20° C.

Sulfate B: $C_{12}/C_{14}$-Fatty alcohol ethersulfate (ethoxylated), sodium salt, anionic surfactant, active content about 65 wt %, solubility in water at least 250 g/l at 20° C.

Sulfonate A: Bis(octyl)sulfosuccinic acid sodium salt, dissolved in water and neopentylglycol, active content about 60 wt %.

Nonionic A: Fatty alcohol alkoxylate, solidifcation temperature about 18° C., kinematic viscosity 30 mm$^2$/s (40° C., ASTM D445).

Nonionic B: Isotridecanol ethoxylate, 70% active content in water, solidification temperature about 7° C., water miscible in all proportions.

Nonionic C: $C_{13}$ oxoalcohol ethoxylated, pure, solidification point below 5° C.

Nonionic D: Cao Guerbet alcohol, alkoxylated, average mass about 440, pure, solidification point below 0° C.

Examples 1 to 7

The emulsifier packages were prepared by mixing the emulsifiers and distilled water as indicated in Table 1 and an aqueous solution of emulsifiers was obtained.

The samples for testing the emulsion stability were prepared by mixing the additive package with diesel fuel. The amount of emulsifier used was 0.05% based on total volume of emulsion, including fuel and water, for all experiments in Table 1.

The used diesel fuel was a marine diesel oil of the type DMA according to DIN ISO 8217 a clear liquid diesel, free of additive packages and had a density of about 0.83 to 0.85.

The emulsion was prepared with a Silverson L5 high shear lab emulsifier based on rotor-stator principle within 10 sec at 7500 rpm at room temperature.

Then the emulsified samples were put in a graduated cylinder which was allowed to stand for up to 30 min. The amount of separated water phase was determined. For example, if 8 ml separated water phase was detected in the 80 ml total volume sample, it corresponded to an emulsion stability of 90%. If no separated water phase was detected this corresponded to 100% emulsion stability. The values are given in Table 1.

Steel Corrosion Test in Accordance with ASTM D 665

The fuel used was commercial DMA Bunker One marine diesel fuel. Added to the formulation were the additive packages specified in the tables that follow under the reaction conditions pointed out, and they were subjected to a corrosion test in accordance with ASTM D 665 A (twice distilled water) or B (synthetic sea water).

As Additive Package 1 a mixture of 18% Sulfate A, 3% Sulfate B, 9% Nonionic C in 70% mono ethyleneglycol was used.

As Additive Package 2 N,N-dimethyl-N-hexydecylamine quaternized with propylene oxide and polyisobutylenesuccinic acid obtained from succinic acid and polyisobutylene (Mn about 1000 g/mol) was used.

The assessment was made as follows:

A 100% rust-free
B++0.1% or less of the total surface area rusted
B+0.1% to 5% of the total surface area rusted
B 5% to 25% of the total surface area rusted
C 25% to 50% of the total surface area rusted
D 50% to 75% of the total surface area rusted
E 75% to 100% of the total surface area rusted ASTM D 665 a (Distilled Water, 4 Hours, 60° C.)

| blank | 500 vppm Additive Package 1 | 1000 vppm Additive Package 1 | 500 vppm Additive Package 1 + 10 vppm isononanoic acid | 1000 vppm Additive Package 1 + 10 vppm 2-ethylhexanoic acid |
|---|---|---|---|---|
| E | A | A | A | A |

ASTM D 665 B (Synthetic Sea Water, 4 Hours, 60° C.)

| blank | 500 vppm Additive Package 1 | 1000 vppm Additive Package 1 | 500 vppm Additive Package 1 + 10 vppm isononanoic acid | 1000 vppm Additive Package 1 + 10 vppm 2-ethylhexanoic acid |
|---|---|---|---|---|
| E | A | A | A | A |

TABLE 1

Additive Packages (all amounts in wt %) and Emulsion stability (lower part)

| | Examples | | | | | | |
|---|---|---|---|---|---|---|---|
| | 1 | 2 | 3 | 4 | 5 | 6 | 7 |
| Water | 87.5 | 87.5 | 87.5 | 87.5 | 87.5 | 87.5 | 87.5 |
| Sulfate A | 7.5 | 7.5 | 7.5 | | 2.5 | 8.125 | 6.25 |
| Sulfate B | 1.25 | 1.25 | 1.25 | | | | |
| Sulfonate A | | | | 2.5 | 6 | | |
| Nonionic A | | | | 2.5 | 4 | | |
| Nonionic B | | | | 7.5 | | | 6.25 |
| Nonionic C | 3.75 | 3.75 | 3.75 | | | 4.375 | |
| Nonionic D | | | | | | | |
| Ratio Fuel:Water | 1:1 | 1:1.4 | 1:2.4 | 1:1.4 | 1:1.4 | 1:1.4 | 1:1.4 |
| 1 min. | 99% | 99% | 99% | 99% | 99% | 99% | 99% |
| 2 min. | 99% | 99% | 99% | 99% | 99% | 99% | 99% |
| 5 min. | 99% | 99% | 99% | 96% | 98% | 98% | 98% |
| 10 min. | 99% | 98% | 97% | 92% | 96% | 96% | 96% |
| 20 min. | 96% | 94% | 93% | 85% | 90% | 91% | 91% |
| 30 min. | 92% | 91% | 89% | 80% | 86% | 88% | 87% |

ASTM D 665 a (Distilled Water, 72 Hours, 60° C.)

| blank | 500 vppm Additive Package 1 | 1000 vppm Additive Package 1 | 500 vppm Additive Package 1 + 10 vppm isononanoic acid | 1000 vppm Additive Package 1 + 10 vppm 2-ethylhexanoic acid |
|---|---|---|---|---|
| E | A | A | A | A |

ASTM D 665 B (Synthetic Sea Water, 72 Hours, 60° C.)

| blank | 500 vppm Additive Package 1 | 1000 vppm Additive Package 1 | 500 vppm Additive Package 1 + 10 vppm isononanoic acid | 1000 vppm Additive Package 1 + 10 vppm 2-ethylhexanoic acid |
|---|---|---|---|---|
| E | A | A | A | A |

Corrosion Test in Water—Methanol 2:1 Mixture

The corrosion test followed the conditions as pointed out in ASTM 0 665, however, not in a hydrocarbon fuel-water mixture but in a water-methanol 2:1 mixture. The rating followed the specification of ASTM D 665.

72 Hours, Room Temperature

| blank | 50 vppm Additive Package 2 | 100 vppm Additive Package 2 | 50 vppm Additive Package 1 | 100 vppm Additive Package 1 |
|---|---|---|---|---|
| D | B++ | B++ | B++ | B++ |

The invention claimed is:

1. A method for powering a diesel engine with a fuel emulsion, the method comprising:
    preparing the fuel emulsion by emulsifying a fuel and water in the presence of an emulsifier package which consists of
    an anionic surfactant selected from the group consisting of sulfates and sulfonates, and
    one or more nonionic surfactants which is an alkoxylated alkanol of the formula (I), $$R^e\text{—O-}(AO)_m\text{—}R^f \tag{I}$$

in which
    $R^e$ is straight-chain or branched alkyl or alkylene with from 1 to 32 carbon atoms,
    AO is an ethylene oxide radical, propylene oxide radical, butylene oxide radical, pentylene oxide radical, styrene oxide radical or a mixture of the abovementioned radicals, in random or block sequence,
    m is a number from 1 to 100, and
    $R^f$ is hydrogen or alkyl with from 1 to 4 carbon atoms,
    wherein the emulsifier package consists of a mixture of anionic surfactants comprising
    at least one sulfate selected from $C_{6-22}$ alkyl sulfates, and
    at least one alkyl ether sulfate of the general formula $R\text{—O—}(CH_2CH_2O)_m SO_3$, in which R is a linear or branched alkyl and/or alkenyl radical having 6 to 22 carbon atoms, and m is a number from 1 to 10, and
    optionally one or more optional ingredients selected from the group consisting of water, organic solvents, aliphatic, cycloaliphatic, or aromatic mono-, di-, or polycarboxylic acids with at least 6 carbon atoms, sulfonates, sulfosuccinates, quaternary ammonium surfactants, carrier oils, cold flow improvers, lubricity improvers, corrosion inhibitors, dehazers, antifoams, cetane number improvers, combustion improvers, antioxidants, stabilizers, antistats, metallocenes, metal deactivators, and dyes,
    wherein said fuel is at least one fuel selected from the group consisting of diesel fuel and a marine fuel obtained from petroleum distillation as a distillate or a residue.

2. The method according to claim 1, wherein
    $R^e$ is straight-chain or branched alkyl or alkylene with from 10 to 22 carbon atoms, and
    $R^f$ is hydrogen.

3. The method according to claim 1, wherein
    AO is an ethylene oxide radical, propylene oxide radical, butylene oxide radical, or a mixture of the abovementioned radicals.

4. The method according to claim 1, wherein the emulsifier package consists of at least two nonionic surfactants which are alkoxylates
    selected from alkoxylated alkanols.

5. The method according to claim 1, wherein the emulsifier package consists of comprises the anionic surfactant and the nonionic surfactant in a weight ratio of 2:1 to 1:10.

6. The method according to claim 1, wherein the anionic surfactant is a sulfate selected from the group consisting of $C_{6-22}$ alkyl sulfates and alkyl ether sulfates of the general formula $R\text{—O—}(CH_2CH_2O)_m SO_3$, in which R is a linear or branched alkyl and/or alkenyl radical having 6 to 22 carbon atoms, and m is a number from 1 to 10.

7. The method according to claim 1, wherein the anionic surfactant further consists of a sulfonate selected from di-$(C_{8-10})$ alkyl sulfosuccinates.

8. The method according to claim 1, wherein the emulsifier package further consists of the at least one aliphatic, cycloaliphatic, or aromatic mono-, di-, or polycarboxylic acid with at least 6 carbon atoms.

9. The method according to claim 1, wherein the emulsifier package consists of at least 10, 30, or 50 wt % of water, an organic solvent, or a mixture of water and an organic solvent.

10. The method according to claim 1, wherein the fuel emulsion comprises the emulsifier package in an amount of 0.01 to 0.4 wt % based on the fuel, and wherein the fuel is a diesel.

11. The method according to claim 1, wherein the fuel emulsion comprises 40 to 80 wt % water.

12. An emulsifier package for emulsifying a fuel and water, consisting of comprising:
    an anionic surfactant selected from the group consisting of sulfates and sulfonates, consisting of comprising
        at least one sulfate selected from $C_{6-22}$ alkyl sulfates, and
        at least one alkyl ether sulfate of the general formula $R\text{—O—}(CH_2CH_2O)_m SO_3$,
    in which R is a linear or branched alkyl and/or alkenyl radical having 6 to 22 carbon atoms, and m is a number from 1 to 10, and
    wherein the sulfonate is selected from di-$(C_{8-10})$ alkyl sulfosuccinates,
    at least two nonionic surfactants which are alkoxylates, wherein the alkoxylates are selected from alkoxylated alkanols of the formula (I), $$R^e\text{—O-}(AO)_m\text{—}R^f \tag{I}$$

in which
    $R^e$ is straight-chain or branched alkyl or alkylene with from 1 to 32 carbon atoms, AO is an ethylene oxide radical, propylene oxide radical, butylene oxide radical, pentylene oxide radical, styrene oxide radical, or a mixture of the abovementioned radicals, in random or block sequence, m is a number from 1 to 100, and $R^f$ is hydrogen or alkyl with from 1 to 4 carbon atoms, and water, and optionally one or more optional ingredients selected from the group consisting of organic solvents, aliphatic, cycloaliphatic, or aromatic mono-, di-, or polycarboxylic acids with at least 6 carbon atoms, sulfonates, sulfosuccinates, quaternary ammonium surfactants, carrier oils, cold flow improvers, lubricity improvers, corrosion inhibitors, dehazers, antifoams, cetane number improvers, combustion improvers, antioxidants, stabilizers, antistats, metallocenes, metal deactivators, and dyes, wherein said fuel is at least one fuel selected from the group consisting of diesel fuel and a marine fuel obtained from petroleum distillation as a distillate or a residue.

13. An emulsifier package for emulsifying a fuel and water, consisting of:

a mixture of anionic surfactants, of comprising at least one sulfate selected from $C_{6\text{-}22}$ alkyl sulfates, and at least one alkyl ether sulfate of the general formula R—O—$(CH_2CH_2O)_m SO_3$, in which R is a linear or branched alkyl and/or alkenyl radical having 6 to 22 carbon atoms, and m is a number from 1 to 10, at least one nonionic surfactant which is an alkoxylated alkanol, water, and optionally one or more optional ingredients selected from the group consisting of organic solvents, aliphatic, cycloaliphatic, or aromatic mono-, di-, or polycarboxylic acids with at least 6 carbon atoms, sulfonates, sulfosuccinates, quaternary ammonium surfactants, carrier oils, cold flow improvers, lubricity improvers, corrosion inhibitors, dehazers, antifoams, cetane number improvers, combustion improvers, antioxidants, stabilizers, antistats, metallocenes, metal deactivators, and dyes, wherein said fuel is at least one fuel selected from the group consisting of diesel fuel and a marine fuel obtained from petroleum distillation as a distillate or a residue.

14. The emulsifier package according to claim 13, wherein the emulsifier package consists of the anionic surfactant and the nonionic surfactant in a weight ratio of 2:1 to 1:10.

15. The emulsifier package according to claim 13, wherein the emulsifier package further consists of at least one aliphatic, cycloaliphatic, or aromatic mono-, di-, or polycarboxylic acid with at least 6 carbon atoms.

16. The emulsifier package according to claim 12, wherein $R^c$ is a straight-chain or branched alkyl or alkylene with from 10 to 22 carbon atoms, and $R^f$ is hydrogen.

17. A marine fuel emulsion, comprising:

a marine fuel obtained from petroleum distillation as a distillate or a residue, water, and an emulsifier package which consists of an anionic surfactant selected from the group consisting of sulfates and sulfonates, and a nonionic surfactant which is an alkoxylated alkanol of the formula (I), $$R^e\text{—O-}(AO)_m\text{—}R^f \qquad (I)$$

in which $R^e$ is straight-chain or branched alkyl or alkylene with from 1 to 32 carbon atoms, AO is an ethylene oxide radical, propylene oxide radical, butylene oxide radical, pentylene oxide radical, styrene oxide radical or a mixture of the abovementioned radicals, in random or block sequence, m is a number from 1 to 100, and $R^f$ is hydrogen or alkyl with from 1 to 4 carbon atoms, wherein the emulsifier package comprises a mixture of anionic surfactants comprising at least one sulfate selected from $C_{6\text{-}22}$ alkyl sulfates, at least one alkyl ether sulfate of the general formula R—O—$(CH_2CH_2O)_m SO_3$, in which R is a linear or branched alkyl and/or alkenyl radical having 6 to 22 carbon atoms, and m is a number from 1 to 10, and optionally one or more optional ingredients selected from the group consisting of water, organic solvents, aliphatic, cycloaliphatic, or aromatic mono-, di-, or polycarboxylic acids with at least 6 carbon atoms, sulfonates, sulfosuccinates, quaternary ammonium surfactants, carrier oils, cold flow improvers, lubricity improvers, corrosion inhibitors, dehazers, antifoams, cetane number improvers, combustion improvers, antioxidants stabilizers, antistats, metallocenes, metal deactivators, and dyes.

18. The marine fuel emulsion according to claim 17, wherein a weight ratio of water to fuel is 1:0.1 to 1:10.

19. The marine fuel emulsion according to claim 17, wherein a weight ratio of anionic surfactant and nonionic surfactant is 2:1 to 1:10.

20. The marine fuel emulsion according to claim 17, wherein said fuel emulsion comprises the emulsifier package in an amount of 0.001 to 1.0 wt %.

* * * * *